United States Patent
Heinrich et al.

(10) Patent No.: US 7,951,416 B2
(45) Date of Patent: May 31, 2011

(54) POLYAMIDE FLUIDIZED-BED-COATING POWDER FOR THIN-LAYER FLUIDIZED-BED COATING

(75) Inventors: Dirk Heinrich, Herten (DE); Heinz Scholten, Haltern am See (DE)

(73) Assignee: Evonik Degussa GmbH, Essen (DE)

( * ) Notice: Subject to any disclaimer, the term of this patent is extended or adjusted under 35 U.S.C. 154(b) by 347 days.

(21) Appl. No.: 12/182,522

(22) Filed: Jul. 30, 2008

(65) Prior Publication Data
US 2008/0286567 A1 Nov. 20, 2008

Related U.S. Application Data

(60) Continuation of application No. 11/693,966, filed on Mar. 30, 2007, now abandoned, which is a division of application No. 10/624,528, filed on Jul. 23, 2003, now abandoned.

(30) Foreign Application Priority Data

Jul. 23, 2002 (DE) .................. 102 33 344

(51) Int. Cl.
*B05D 1/24* (2006.01)
*C08G 69/46* (2006.01)
(52) U.S. Cl. .............. 427/185; 427/459; 528/496
(58) Field of Classification Search .......... 427/185, 427/459; 528/496
See application file for complete search history.

(56) References Cited

U.S. PATENT DOCUMENTS

| | | | |
|---|---|---|---|
| 3,910,861 A | 10/1975 | Wolvers et al. | |
| 4,334,056 A | 6/1982 | Meyer et al. | |
| 4,543,378 A | 9/1985 | Suhara et al. | |
| 4,687,837 A * | 8/1987 | Mumcu | 528/496 |
| 4,687,838 A | 8/1987 | Mumcu et al. | |
| 4,707,513 A | 11/1987 | Baer | |
| 5,135,991 A | 8/1992 | Suzuki | |
| 5,139,821 A * | 8/1992 | Suzuki | 427/195 |
| 5,932,687 A | 8/1999 | Baumann et al. | |
| 6,099,897 A | 8/2000 | Sayo et al. | |
| 6,127,513 A | 10/2000 | Ohara et al. | |
| 6,777,488 B1 | 8/2004 | Araki et al. | |

FOREIGN PATENT DOCUMENTS

| | | |
|---|---|---|
| DE | 44 21 454 | 12/1995 |
| EP | 0 536 791 | 4/1993 |
| EP | 0 863 174 | 9/1998 |

OTHER PUBLICATIONS

Encyclopedia of Materials Science & Engineering, Ed by M B Bever, v.5, pp. 3859-3864, 1986.*
Derwent Patent Abstract; DE 44 21 454 A1 (English Abstract Only), Huels, Dec. 1995.
Derwent Patent Abstract; EP 0 863 174.A1 (English Abstract only), Nippon, Apr. 1993.

* cited by examiner

*Primary Examiner* — Frederick J Parker
(74) *Attorney, Agent, or Firm* — Oblon, Spivak, McClelland, Maier & Neustadt, L.L.P.

(57) ABSTRACT

One embodiment of the present invention provides a polyamide powder, which includes polyamide particles having a median grain size d 50 of from 20 to 90 μm, a content of fines <5 μm of below 1% by weight, and at least 75% by weight of spherical particles in which all three spatial axes x, y and z of the individual particles have the same dimensions to within ±10%. Other embodiments of the invention provide a process for making and using the powder, and articles coated articles obtained thereby.

13 Claims, 1 Drawing Sheet

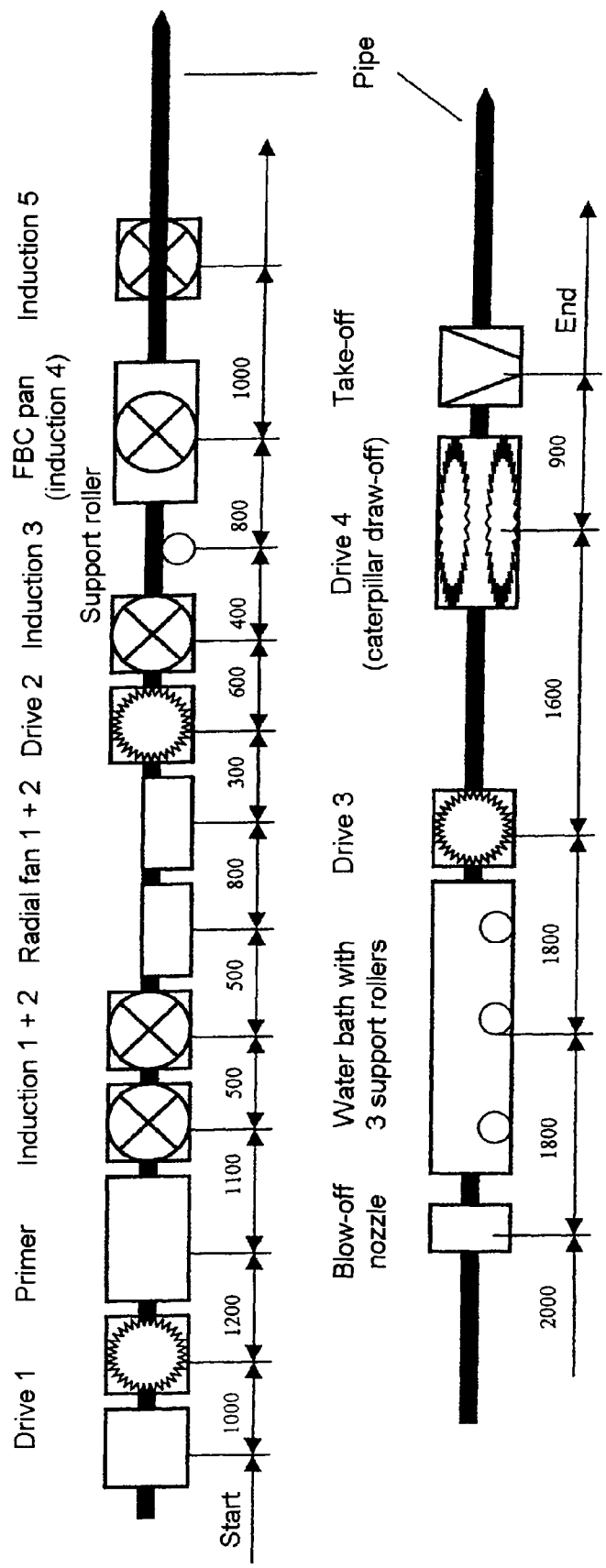

POLYAMIDE FLUIDIZED-BED-COATING POWDER FOR THIN-LAYER FLUIDIZED-BED COATING

BACKGROUND OF THE INVENTION

1. Field of the Invention

The present invention relates to polyamide fluidized-bed coating powders, methods of making, and methods of use.

2. Discussion of the Background

Polyamide powders based on nylon-11 and nylon-12 and specifically developed for the fluidized-bed coating process generally have a median grain diameter d 50 to DIN EN ISO 4610 of from 95 to 120 µm. They generally have a bulk density to DIN 53 466 of from 400 to 600 g/l.

The powders are supplied as precipitated or ground powders made from the corresponding granular polyamide. Ground powders are produced by grinding in a mill, and precipitated powders are produced by dissolving the granular material in a solvent and precipitating, as in DE 29 06 647 B1. The latter process gives a polyamide powder with round grain shape, which is a consequence of the precipitation process. Unlike the precipitated powder, the ground powder has a sharp-edged grain.

Examples of precipitated nylon-12 powders are VESTOSINT® 1101, 1111, 1121, 1141, and 1161 (Degussa AG), and examples of ground nylon-11 powders for fluidized-bed coating are Rilsan® T 7260 gray and/7050 white (Atofina).

In the fluidized-bed coating process, hot metal parts are immersed into a pan with fluidizing polymer powder. The powder sinters on the hot metal surface and coalesces to give a homogeneous coating. A precondition for this is that the metal surface has a temperature above the melting point of the polymer powder.

Typically, a polyamide coating in a fluidized-bed coating process has a layer thickness of from 200 to 500 µm, or in specific instances even up to about 1000 µm. Layers thinner than about 200 µm are impossible or very difficult to produce by the fluidized-bed coating process using conventional fluidized-bed coating powders.

In coating technology, experience has led to acceptance that when using the polyamide fluidized-bed-coating powders commonly encountered in the market the thickness of a smooth coherent film has to be at least 2×d 50 of the powder. Since commercially available fluidized-bed-coating powders have a d 50 value of from 95 to 120 µm, the resultant lower limit for coating is about 200 µm.

The difficulties with lower film thicknesses are a consequence of immersion time and object temperature. On the one hand, the hot object can be immersed only briefly in order that there is no excessive growth of layer thickness on the surface, but on the other hand the powder needs a certain minimum immersion time in the bath if all of the corners and edges of the particular object are to be covered so that there are no uncoated defective areas.

For thin coatings of from 50 to 200 µm, therefore, use is frequently made of processes other than fluidized-bed coating, examples being ES spraying, high-temperature spraying, tribo spraying, and minicoating.

Minicoating is the most similar to fluidized-bed coating. Here, hot metal parts fall into a polyamide powder bed which, however, does not become fluidized. The metal parts pick up powder for as long as there is enough energy to melt the polymer. Initially a rough coating forms, since the component does not possess sufficient heat to make the slightly sintered powder coalesce to give a homogenous layer. If a smooth homogeneous surface is desired, this can be achieved by post-heating in an oven or irradiating with a heat source.

This process has been used especially for small and light metal parts, for example for corsetry clips. Examples of typical minicoating powders are VESTOSINT® 1164, 1174, and 2157 (Degussa) and Rilsan® 1452 MAC (Atofina). The median grain size d 50 of these powders is typically from 20 to 70 µm.

The bulk density of minicoating powders is mostly somewhat lower than for fluidized-bed coating powders. It is generally above 300-350 g/l.

Typical minicoating powders have markedly poorer fluidizing properties than specific fluidized-bed-coating powders, since their bulk density is lower and their grains are finer. Commercially available fine powders and minicoating powders have limited applicability in the typical fluidized-bed coating process.

However, there has recently been increased demand for polyamide powders intended to achieve thin layers in the range from 50 to 200 µm in the fluidized-bed coating process.

An example of an application of this type is the chromium-free coating of metal pipes for corrosion protection in the automotive industry, for example as described in U.S. Pat. No. 6,276,400 B1. For continuous pipe coating as in U.S. Pat. No. 6,276,400 B1 the traditional minicoating process is unsuitable. The process requires a fluidized-bed coating pan through which the pipe is continuously drawn. In this process there is local heating of the pipe to a temperature above the melting point of the polymer, preferably by induction.

The coating of pipes of this type for the automotive industry necessitates stringent requirements for layer thickness and coating homogeneity. On the one hand, the layer thickness should be as small as possible to save weight, but on the other hand the polyamide layer serves as corrosion protection on a component important for safety (brake piping, fuel piping) and therefore has to have absolutely no defects or variations in mechanical properties.

SUMMARY OF THE INVENTION

Accordingly, one object of the present invention is to develop a polyamide fluidized-bed-coating powder useful for thin-layer fluidized-bed coating which permits the production of very homogeneous thin coatings.

This object and others has now been attained with the present invention, the first embodiment of which provides a polyamide powder, which includes polyamide particles having:

a median grain size d 50 of from 20 to 90 µm, a content of fines <5 µm of below 1% by weight, and at least 75% by weight of spherical particles in which all three spatial axes x, y and z of the individual particles have the same dimension to within ±10%. Other embodiments of the invention provide a process for making and using the powder, and articles coated articles obtained thereby.

Another embodiment of the invention provides a process, which includes:

screening a polyamide powder to remove particles having a size of >125 µm to obtain a screened powder;

mechanically post-treating the screened powder to round off corners and edges, to obtain a post-treated powder; and removing a portion of fines having a size of <5 µm from the post-treated powder, to obtain the above-mentioned polyamide powder.

Another embodiment of the invention provides a coated surface, prepared by a process which includes, in a fluidized-bed coating process, fluidizing the above-mentioned polyamide powder, contacting the fluidized powder with a metal surface, and forming a polyamide coating on the metal surface.

Another embodiment of the invention provides a process for coating a surface, which includes, in a fluidized-bed coating process, fluidizing the above-mentioned polyamide powder, contacting the fluidized powder with a metal surface, and forming a polyamide coating on the metal surface.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein an automatic system for external coating of pipes by fluidized-bed coating is shown, having the following parts.

1) the pre-treatment system for cleaning the pipes;
2) the primer (adhesion promoter) pan for applying the adhesion promoter between steel surface and polymer layer (spray system or immersion system);
3) the medium-frequency induction coil 1 for baking the primer and, if a solvent-containing primer is used, for evaporating the solvent;
4) the radial fan for faster dissipation of the evaporated solvent;
5) the medium-frequency induction coil 2 for preheating the pipe;
6) the fluidized-bed coating pan with integrated medium-frequency induction coil 3 for applying the coating material;
7) the internals in the fluidized-bed coating pan, composed of air-flush system above the pipe to eliminate powder accumulations and of metal flow guide panels below the pipe to eliminate powder shortages and resultant pores on the underside of the pipe;
8) the medium-frequency induction coil 4 for smoothing the incompletely molten polyamide layer;
9) the melting section, needed for thorough melting and thus smoothing of the adherent polyamide deposit after the pipe emerges from the medium-frequency induction coil 4;
10) the air-flush system for preliminary cooling of the pipe surface;
11) the water-based cooling system.

DESCRIPTION OF THE PREFERRED EMBODIMENTS

Various other objects, features and attendant advantages of the present invention will be more fully appreciated as the same becomes better understood from the following detailed description of the preferred embodiments of the invention.

Surprisingly, it has now been found that use of the polyamide powder of the invention can produce very homogeneous layer thicknesses of from 50 to 200 μm by the traditional fluidized-bed coating process. This range includes 55, 60, 65, 70, 75, 80, 85, 90, 95, 100, 120, 130, 140, 150, 160, 170, 180, 190 and 195 μm.

Unlike commercially available polyamide fluidized-bed-coating powders, the polyamide powder of the invention has fine particles, and its particle size is similar to that of a minicoating powder. The median grain diameter d 50 of the powder of the invention is from 20 to 90 μm. The upper grain size limit is 125 μm. The comparatively small particle size permits production of thin and uniform coatings below 200 μm. The above range for the median grain diameter d 50 of the powder of the invention includes 25, 30, 40, 45, 50, 55, 60, 65, 70, 75, 80 and 85 μm. The above range for the upper grain size limit includes 120, 115, 110, 100, 90, 80, 70, 60, and 50 μm.

In order that the powder nevertheless has good fluidizing properties, the powder of the invention has specific characteristics. Unlike conventional minicoating powders and fine powders for the coating industry, the powder of the invention is free from extreme fines, the <5 μm content being well below 1%. This range includes $\leq 0.9$, 0.7, 0.5, 0.3, 0.1, 0.09, 0.07, 0.05, 0.03, 0.01, 0.009, 0.007, 0.005, 0.003. and 0.001%.

Another characteristic feature of the powder of the invention is the particularly round grain shape, which achieves a significant improvement in fluidizing properties.

The powder of the invention has a content of above 75% of substantially spherical particles in which all three spatial axes x, y and z of the grain have the same dimension to within ±10%. This range includes ±9, 8, 7, 6, 5, 4, 3, 2, and 1%.

Preferably, the dimension is measured as the diameter of the particle. This can be supported by REM.

Preferably, the percent contents are measured with respect to the weight of the powder unless otherwise stated.

The powder of the invention preferably has a content of above 80% of substantially spherical particles in which all three spatial axes x, y and z of the grain have the same dimension to within ±10%. This range includes $\geq 81$, 83, 85, 87, 90, 93, 95, 97 and 99%.

The particle size distribution is determined by laser diffraction (Malvern) to DIN EN ISO 4610 (the entire contents of which being hereby incorporated by reference), and the grain shape is determined via modern image evaluation systems and scanning electron micrographs. The powders of the invention are preferably produced from a precipitated powder as in DE 29 06 647 B 1, the entire contents of which being incorporated herein by reference. The starting material provided by this process is intrinsically rounder than a conventional ground powder. The particular feature of the powder of the invention is the mechanical post-treatment in which corners and edges present are rounded off as required, typically in slow-running mills or specific impact equipment which avoids complete comminution/break-up of the particles but breaks off, or rounds off, corners and edges.

Low-viscosity polyamide powders are preferably used in order that the powder coalesces particularly readily and uniformly. The relative solution viscosity ($\eta_{rel}$) of the powder of the invention to EN ISO 307 (the entire contents of which being incorporated herein by reference) is from 1.30 to 1.65, preferably from 1.40 to 1.63. These ranges include 1.31, 1.33, 1.35, 1.37, 1.39, 1.41, 1.43, 1.45, 1.47, 1.49, 1.50, 1.51, 1.53, 1.57, 1.59, 1.60 and 1.61.

In order to improve the flow behavior when the thin-layer fluidized-bed powder melts, regulators containing amino end groups and/or containing carboxy groups can be added to slow the post-condensation. These may be dicarboxylic acids or diamines, for example. Depending on the regulator, the preferred ratio between amino end groups and carboxy end groups is $\leq 1:3$, or $\geq 3:1$. These ranges include 1:4, 1:5, 1:6, 1:7, 1:9 and 1:10; and 3:1, 4:1, 5:1, 6:1, 7:1, 8:1, 9:1 and 10:1.

The flowability or fluidizability of the powder of the invention may be optimized via additives. These may be finely divided inorganic additives. Commercially available examples are titanium dioxides, aluminum oxides, and fine-particle silicas.

The present invention desirably allows for the chromate-free coating of pipes by fluidized-bed coating with the present polyamide powder.

The polyamide powders of the invention are particularly used in the thin-layer fluidized-bed coating process. A typical system for coating metal pipes is described below.

The polyamide powders of the invention may be applied using any of the known fluidized-bed coating processes. The system described below is particularly suitable for chromate-free coating by the fluidized-bed coating process. The system is automatic and serves for external coating of pipes by fluidized-bed coating. It is composed of the following parts:

1) the pre-treatment system for cleaning the pipes, which are mostly delivered greased;

2) the primer (adhesion promoter) pan for applying the adhesion promoter between steel surface and polymer layer (spray system or immersion system);

3) the medium-frequency induction coil 1 for baking the primer and, if a solvent-containing primer is used, for evaporating the solvent;

4) the radial fan for faster dissipation of the evaporated solvent;

5) the medium-frequency induction coil 2 for preheating the pipe;

6) the fluidized-bed coating pan with integrated medium-frequency induction coil 3 for applying the coating material. The dielectric dissipation factor of the coating material is too low for it to become heated, whereas the preheated steel pipe passing through the system becomes heated very rapidly to the desired temperature. The decisive factors controlling layer thickness during fluidized-bed coating are preheat temperature and immersion time. In the case where a pipe is passing through the system this means that the layer thickness can be controlled via the generator power and the advance rate of the pipe. Both of these can be controlled independently of one another from the control desk;

7) the internals in the fluidized-bed coating pan, composed of air-flush system above the pipe to eliminate powder accumulations and of metal flow guide panels below the pipe to eliminate powder shortages and resultant pores on the underside of the pipe. Uniform layer thickness both radially and axially can be ensured only by using the specific internals;

8) the medium-frequency induction coil 4 for smoothing the incompletely molten polyamide layer;

9) the melting section, needed for thorough melting and thus smoothing of the adherent polyamide deposit after the pipe emerges from the medium-frequency induction coil 4. During passage through the system the layer is still hot and soft and can therefore easily be damaged. Passing of the pipe over rollers is therefore not permissible in this phase;

10) the air-flush system for preliminary cooling of the pipe surface. This controls the pipe surface temperature to below the melting point of the polyamide;

11) the water-based cooling system. The pipe runs into a water trough in which the layer further cools and hardens, and passage over rollers is therefore again possible here.

The induction coils of 5, 6, and 8 are used as required by the desired layer thickness. The possibilities here for use of the induction coils are:

5 and 8,
5 and 6,
5, 6, and 8,
6,
6 and 8.

The pipes are heated by medium-frequency induction. Using the process, it is possible for pipe sections of any desired length to be coupled together to give a continuous line and to be coated externally with polymer powder by a process involving horizontal passage through the system. The homogeneous layer thickness distribution of the external pipe coating is from 120 to 180 µm, preferably 150 µm. A commercially available adhesion promoter (e.g. VESTOSINT adhesion promoter WS 5) is applied to the pipe surface. The layer thickness of the primer after air-drying is from 5 to 8 µm, which range includes 5.1, 5.3, 5.5, 5.7, 5.9, 6.1, 6.3, 6.7, 6.9, 7.3, 7.5, 7.7 and 7.9 µm. The solids content of the adhesion promoter is about 8%.

The pipes produced by the process of the invention are particularly suitable as hydraulic piping or brake piping, e.g. for the automotive industry.

Other preferred embodiments are listed below in A-G:

A. A polyamide powder for coating metal surfaces by the fluidized-bed coating process, wherein
the powder has a median grain size d 50 of from 20 to 90 µm,
the content of fines <5 µm is below 1%, and
the powder has at least 75% of spherical particles in which all three spatial axes x, y and z of the grain have the same dimension to within ±10%.

B. The polyamide powder as recited in A, wherein
the powder has at least 80% of spherical particles in which all three spatial axes x, y and z of the grain have the same dimension to within ±10%.

C. The polyamide powder as recited in any of A-B, which includes a polyamide selected from the group including nylon-11 and nylon-12.

D. The polyamide powder as recited in any of A-C, which has an $\eta_{rel}$ of from 1.30 to 1.65.

E. The polyamide powder as recited in any of A-D, which has an $\eta_{rel}$ of from 1.40 to 1.63.

F. The polyamide powder as recited in any of A-E which has been regulated and has a ratio of $\geq$3:1 or $\leq$1:3 between amino end groups and carboxy end groups.

G. A fluidized-bed coating based on the powder as recited in any of A-F, wherein the polyamide layer thickness is from 50 to 200 µm.

EXAMPLES

Having generally described this invention, a further understanding can be obtained by reference to certain specific examples which are provided herein for purposes of illustration only and are not intended to be limiting unless otherwise specified.

Example 1

Preparation of the Powder A of the Invention

A granular nylon-12 regulated using dicarboxylic acids and having an amino end group content of 40 mmol/l and a carboxy end group content of 180 µmol and an $\eta_{rel}$ of 1.55 is precipitated as in DE 29 06 647 from hot alcohol. The precipitated powder has a median grain size d 50 of 61 µm and has a proportion of about 70% of spherical particles in which all three spatial axes x, y and z of the grain have the same dimension to within ±10%.

The resultant crude powder is approximately comparable with a typically commercially available fine polyamide powder, such as VESTOSINT 2157.

In a further operation, the crude powder is first freed from coarse particles >125 µm through a screen, and is post-treated for 10 minutes in an impact pan mill (Hybridizer, NARA). The resultant treated powder is then freed from extreme fines in a pneumatic classifier. The proportion <5 µm is 0.1%.

The resultant powder has a median grain size d 50 of 52 µm and has a proportion of 84% of spherical particles in which all three spatial axes x, y and z of the grain have the same dimension to within ±10%. The powder has a bulk density of 380 g/l. The powder is treated with 1.0 part of flame black and 0.05 part, based on 100 parts of polyamide powder, of a fine-particle silica (Aerosil 200).

Coating Trials

The powder of the invention from example 1 is processed on the trial system described above for coating metal pipes with the aid of induction heating. For comparison, a number of commercially available polyamide powders (Degussa AG) were used. These are VESTOSINT 1111 black, a commercially available fluidized-bed coating powder, VESTOSINT 1174 white, a minicoating powder comprising titanium dioxide, and VESTOSINT 2157 black, a fine powder used, inter alia, in coil coatings. The results are given in table 1.

All of the pipes were pretreated with VESTOSINT adhesion promoter WS 5 (Degussa), layer thickness about 5 μm.

TABLE 1

Coating trials

| Product | d 50 (μm) | <5% (%) | Proportion of spherical particles (%) | Pipe layer thickness achieved (μm) | Max. radial layer thickness difference (μm) | Dusting (sec) | Fluidization (grade) |
|---|---|---|---|---|---|---|---|
| Polyamide powder A | 52 | 0.1 | 84 | 120 | <5 | <5 | 1-2 |
| VESTOSINT 2157 | 57 | 0.5 | ~70 | 120 | 10 | 10 | 3 |
| VESTOSINT 1111 | 100 | 0.1 | ~65 | 200 | <5 | <5 | 1 |
| VESTOSINT 1174 | 40 | 8 | ~70 | 130 | 20 | >15 | 5 |

The polyamide powder of the invention gave a very homogeneous coating on the metal pipe, the quality of the coating reaching that of a traditional fluidized-bed-coating powder. In terms of dusting and fluidization, the powder exhibits comparably good processing properties. The polyamide powder of the invention can achieve desired layer thicknesses below 200 μm. Satisfactory layer thicknesses of 120 μm could be achieved in the trial reproducibly, without defects.

In contrast, the only layer thicknesses which could be achieved in comparable quality using commercially available fluidized-bed-coating powders were 200 μm and above.

Conventional, commercially available minicoating powders and conventional, commercially available fine powders exhibit markedly poorer fluidization properties in comparison, and more dusting at the fluidizing pan.

Although coherent layers of from 120 to 130 μm could be achieved on the test system, these exhibit markedly greater coating inhomogeneity, attributed mainly to the poorer fluidizing behavior. The radial layer thickness difference is determined by evaluating photographs of cross sections.

This application is based on German patent application DE 102 33 344.0, filed Jul. 23, 2002, the entire contents of which are hereby incorporated by reference, the same as if set forth at length.

Obviously, numerous modifications and variations of the present invention are possible in light of the above teachings. It is therefore to be understood that within the scope of the appended claims, the invention may be practiced otherwise than as specifically described herein.

The invention claimed is:

1. A process for obtaining a polyamide powder, comprising:
    screening a polyamide powder to remove particles having a size of >125 μm to obtain a screened powder;
    mechanically post-treating the screened powder to round off corners and edges, to obtain a post-treated powder; and
    removing a portion of fines having a size of <5 μm from the post-treated powder, to obtain a polyamide powder product, comprising
        polyamide particles having a median grain size d 50 of from 20 to 90 μm,
        a content of fines <5 μm of below 1% by weight, and
        at least 75% by weight of spherical particles in which all three spatial axes x, y and z of the individual particles have the same dimension to within ±10%.

2. The process as claimed in claim 1, wherein said post-treating comprises rounding off the corners and edges in a mill, an impact device, or both.

3. The process as claimed in claim 1, wherein the portion of fines are removed in a pneumatic classifier.

4. The process as claimed in claim 1, further comprising, in a fluidized-bed coating process, fluidizing said polyamide powder product, and contacting the fluidized powder with a metal surface.

5. A process for coating a surface, comprising:
    in a fluidized-bed coating process, fluidizing a polyamide powder, to obtain a fluidized polyamide powder;
    contacting the fluidized powder with a metal surface and forming a polyamide coating on said metal surface;
    wherein said coating has a thickness of 50 to 200 μm;
    wherein said polyamide powder comprises
        polyamide particles having a median grain size d 50 of from 20 to 90 μm,
        a content of fines <5 μm of below 1% by weight, and
        at least 75% by weight of spherical particles in which all three spatial axes x, y and z of the individual particles have the same dimension to within ±10%.

6. The process according to claim 5, wherein in said polyamide powder, at least 80% by weight of spherical particles in which all three spatial axes x, y and z of the individual particles have the same dimension to within ±10%.

7. The process according to claim 5, wherein said polyamide is selected from the group consisting of nylon-11 and nylon-12.

8. The process according to claim 5, wherein said polyamide powder has an $\eta_{rel}$ of from 1.30 to 1.65.

9. The process according to claim 5, wherein said polyamide powder has an $\eta_{rel}$ of from 1.40 to 1.63.

10. The process according to claim 5, wherein the polyamide powder further comprises one or more regulators having amino end groups and carboxy end groups, and wherein a ratio of the amino end groups to the carboxy end groups is $\geq 3:1$ or $\leq 1:3$.

11. The process according to claim 10, wherein the regulators are selected from the group consisting of dicarboxylic acid, diamine, and combinations thereof.

12. The process according to claim 5, wherein said polyamide powder further comprises at least one member selected from the group consisting of titanium dioxide, aluminum oxide, and silica.

13. The process according to claim 5, wherein said polyamide powder has an upper grain size limit of 125 μm.

* * * * *